United States Patent
Yun et al.

(10) Patent No.: US 8,184,571 B2
(45) Date of Patent: May 22, 2012

(54) METHOD OF CHANGING A SOURCE COVERAGE AREA TO A TARGET COVERAGE AREA IN A TERMINAL, A SWITCHING FRAME AND A REVERSE-CHANNEL QUALITY INDICATOR CHANNEL THEREOF

(75) Inventors: Young Woo Yun, Seoul (KR); Chang Woo Hong, Daegu (KR)

(73) Assignee: LG Electronics Inc., Seoul (KR)

( * ) Notice: Subject to any disclaimer, the term of this patent is extended or adjusted under 35 U.S.C. 154(b) by 1171 days.

(21) Appl. No.: 10/384,518

(22) Filed: Mar. 11, 2003

(65) Prior Publication Data

US 2003/0169701 A1    Sep. 11, 2003

(30) Foreign Application Priority Data

Mar. 11, 2002    (KR) .................. 10-2002-0013064

(51) Int. Cl.
H04B 7/185    (2006.01)
(52) U.S. Cl. .................. 370/318; 370/331; 370/332
(58) Field of Classification Search .................. 370/318, 370/331, 332
See application file for complete search history.

(56) References Cited

U.S. PATENT DOCUMENTS

| | | | | |
|---|---|---|---|---|
| 6,253,085 | B1 * | 6/2001 | Bender | 455/442 |
| 7,058,035 | B2 * | 6/2006 | English | 370/332 |
| 7,113,538 | B1 * | 9/2006 | Chen et al. | 375/150 |
| 2003/0099209 | A1 * | 5/2003 | Laakso et al. | 370/311 |
| 2003/0129989 | A1 * | 7/2003 | Gholmieh et al. | 455/452 |
| 2003/0166407 | A1 * | 9/2003 | Qian et al. | 455/522 |
| 2003/0169705 | A1 * | 9/2003 | Knisely et al. | 370/332 |
| 2003/0195017 | A1 * | 10/2003 | Chen et al. | 455/562.1 |
| 2004/0013103 | A1 * | 1/2004 | Zhang et al. | 370/345 |
| 2004/0203991 | A1 * | 10/2004 | Chen et al. | 455/522 |

FOREIGN PATENT DOCUMENTS

KR    10-2001-0023790 A    3/2001

* cited by examiner

Primary Examiner — Charles Appiah
Assistant Examiner — Jaime Holliday
(74) Attorney, Agent, or Firm — KED & Associates, LLP

(57) ABSTRACT

A switching frame includes information on a carrier-to-interference ratio that is included on a first time slot corresponding to a boundary with a previous frame and corresponds to a target coverage area having a first power level, and at least on up/down command information for the carrier-to-interference ratio that is included after the first time slot and has the same power level as the first power level.

5 Claims, 1 Drawing Sheet

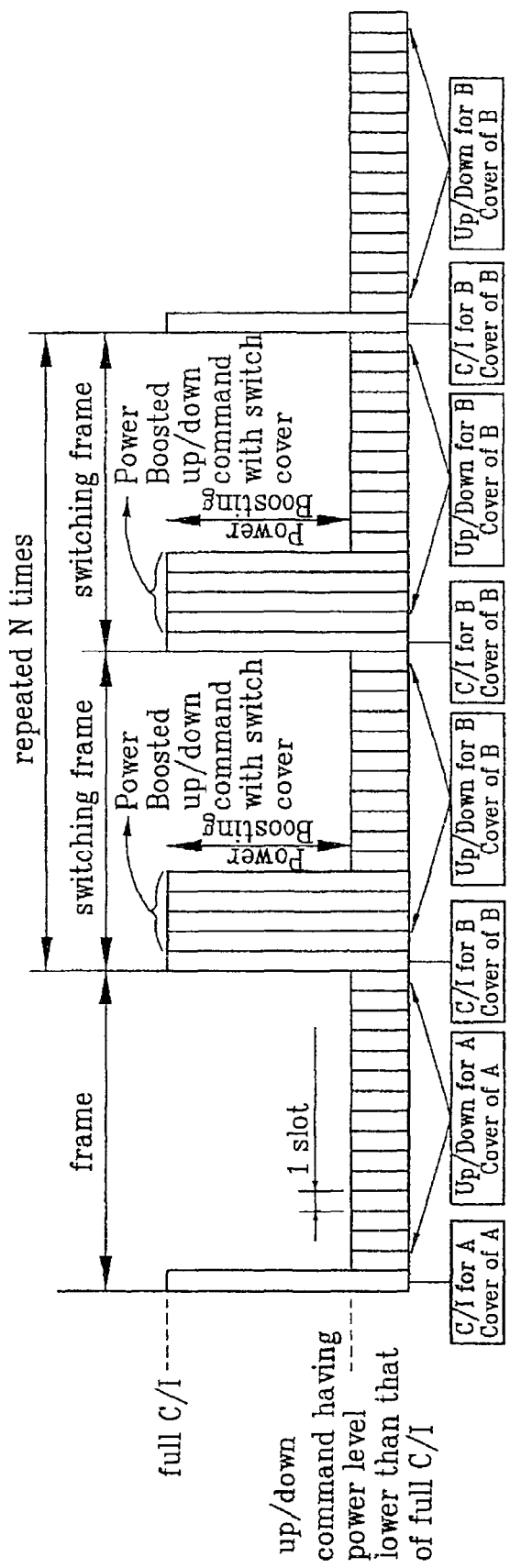

METHOD OF CHANGING A SOURCE COVERAGE AREA TO A TARGET COVERAGE AREA IN A TERMINAL, A SWITCHING FRAME AND A REVERSE-CHANNEL QUALITY INDICATOR CHANNEL THEREOF

BACKGROUND OF THE INVENTION

1. Field of the Invention

The present invention relates to reverse-channel quality indicator channel (R-CQICH), and more particularly to the R-CQICH physical channel.

2. Background of the Related Art

In an 1x EV-DV (1x EV-Data & Voice) system or cdma2000 Revision C, a reverse-channel quality indicator channel (hereinafter referred to as R-CQICH) has been defined in order to support a high-rate packet data service. However, the proposal contained therein is not optimal for switching of the mobile station between cells or sectors.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a method of changing a source coverage area to a target coverage area in a terminal, a switching frame and a reverse-channel quality indicator channel according to the method that substantially obviate one or more problems due to limitations and disadvantages of the related art.

An object of the present invention is to provide a method of changing a source coverage area to a target coverage area in a terminal, a switching frame and a reverse-channel quality indicator channel according to the method that can minimize an error generation in receiving channel information and/or switching indication information from the terminal during switching of a cell/sector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of changing a source coverage area to a target coverage area in a terminal, includes the steps of searching the target coverage area corresponding to a best coverage area among active coverage area sets during transmission of a carrier-to-interference ratio of the present source coverage area, including information on a carrier-to-interference ratio of the target coverage area and at least one up/down command information for the carrier-to-interference ratio of the target coverage area in a switching frame with a same power level when a switching from the source coverage area to the target coverage area is required, and transmitting the switching frame to a corresponding base transceiver subsystem of the source coverage area.

In another aspect of the present invention, a reverse-channel switching frame includes information on a carrier-to-interference ratio that is included on a first time slot corresponding to a boundary with a previous frame and corresponds to a target coverage area having a first power level, and at least one up/down command information for the carrier-to-interference ratio that is included after the first time slot and has the same power level as the first power level.

In still another aspect of the present invention, a reverse-channel quality indicator channel includes at least one first frame having information on a carrier-to-interference ratio of a target coverage area having a first power level, at least one up/down command information for the carrier-to-interference ratio having the first power level, and at least one up/down command information having a second power that is lower than the first power level; and at least one second frame having information on a carrier-to-interference ratio of a target coverage area having the first power level, and at least one up/down command information having the second power level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 illustrates the frame formats for transmitting channel information and/or switching indication information on a R-CQICH according to a preferred embodiment of the present invention.

DETAILED DESCRIPTION OF PREFERRED EMBODIMENTS

The mobile station sends signal quality (CQI) feedback information on R-CQICH physical channel. The information can be used by the base station to determine at least one of the following: transmission power levels, data transmission rates (e.g., encoder packet sizes and transmission slot durations), when to schedule a particular mobile station on the packet data channel, and when to handoff transmission on the packet data channel from one pilot (e.g., sector or base transceiver subsystem (BTS)) to another sector or BTS. A cell includes a plurality of sectors and each sector is formed under a power control of the BTS.

During handoff or switching, the R-CQICH may be used to point the best serving cell/sector among cells/sectors that belong to an active set (or active coverage area). In other words, since the whole or a portion of the R-CQICH is covered with an inherent cover, e.g., Walsh code, of the best cell or sector, a corresponding BTS can recognize the best (or better) serving cell or sector by discovering the R-CQICH.

A plurality of frames are transmitted on the R-CQICH. Each frame has a first prescribed duration and includes a plurality of slots, each slot having a second prescribed duration. For example, if each frame is 20 ms, and there are 16 slots/frame, each slot has a duration of 1.25 ms. A frame of the R-CQICH physical channel is to report channel information represented by a power ratio of a carrier-to-interference (C/I)

signal of a carrier of the best or current cell or sector. The format of each frame of the R-CQICH can comprise two case as follows:

(1) A full C/I transmission is sent at every slot; or
(2) A full C/I transmission is sent once every 16 slots with differential transmissions in between.

FIG. 1 illustrates the frame formats for transmitting channel information and/or switching indication information on a reverse link according to a preferred embodiment of the present invention. The height in the rectangles represent the power transmitted in that slot. In this preferred embodiment, there are 16 slots (Si) with slot indices (i) from 0-15. As can be appreciated, the slot indices (i) can be from 1 to 16, and the preferred embodiment is readily applicable to 15 slots.

If no switching is required from a current cell or sector A, e.g., cell or sector A is the best serving cell or sector, a terminal or mobile station transmits a 4-bit full C/I information (full report or message) with a cover of the current cell/sector A at slot S0 and quality up/down command information (1-bit DM information or differential report) at slots S1-S15 with the cover of the current cell or sector A. The full C/I information represents the C/I information having a full power preset in the corresponding communication system. The quality up/down command information indicates whether the 4-bit full C/I information and the quality thereof have increased or decreased.

However, if the terminal determines that a cell or sector switching is required, i.e., a target cell or sector is a better or best serving cell or sector, the terminal transmits at least one switching frame for providing channel information and indication information to the corresponding BTS in the R-CQICH. The switching frame includes full C/I information of a target cell or sector to the corresponding BTS together with a cover (or switch cover, i.e., null cover or target cell/sector cover) of the target cell or sector at slot S0. For a prescribed number (n) of slot indices, n number of up/down command information of at least one of time slots S1-S4 with a cover of the target sector or cell are power boosted. In FIG. 1, the power level of the power boosted up/down command information is identical to the full C/I information of the target cell or sector. However, this boosted power level need not be identical to the full C/I information as long as it is greater than the remaining up/down command information.

For the remaining time slots, the terminal transmits second up/down command information for the target cell or sector with a power level lower than that of the full C/I information to the corresponding BTS together with the cover of the target cell/sector. The switching frame is repeated N number of time, e.g, 3, 6 or 12.

As described above, n number of up/down command information of at least one of slots S1-S4 with a cover of the target sector or cell are power boosted. For example, C/I measurement taken at slot S1 may be repeated (repetition for reduced rate modes) for slots S1-S4. Alternatively, C/I measurement taken at slot S2 may be repeated for slots S3 and S4 while slots S1 and S2 include the C/I measurements taken at slot S1 and S2, respectively. As can be appreciated, there are different method for repetition of the C/I measurements.

The present invention has various advantages. Unlike the proposal, the present invention reduces the error generation during the cell or sector switching by heightening the recognition reliability of the target cover detected by the corresponding BTS. In other words, a high error rate due to an instantaneous deterioration of the channel environment can be prevented, and thus a proper scheduling can be performed for cell or sector switching. Hence, the interruption in C/I feedback to a corresponding BTS during cell or sector switching interval is minimized and the detection of mobile station switching indication is more accurately performed. Further, the false alarm rate can be reduced. Moreover, it is possible to soft combine the switching indication slots across the 20 ms frame.

The above references are incorporated by reference herein where appropriate for appropriate teachings of additional or alternative details, features and/or technical background.

An object of the invention is to solve at least the above problems and/or disadvantages and to provide at least the advantages described hereinafter.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for transmitting a reverse-channel switching frame by a mobile terminal, the method comprising:
   preparing the reverse-channel switching frame; and
   transmitting the reverse-channel switching frame from the mobile terminal to a corresponding base transceiver subsystem of a source coverage area,
   wherein the reverse-channel switching frame comprises:
   information on a carrier-to-interference ratio that is included on a first slot of the reverse-channel frame, transmitted by using a first power level of the mobile terminal;
   information consisting of an UP or down command information in a form of first type of differential information for the carrier-to-interference ratio, transmitted by using a second power level of the mobile terminal that is lower than the first power level; and
   switching indication information consisting of an up or down command information in a form of second type of differential information for the carrier-to-interference ratio, the switching indication information being covered with a Walsh code corresponding to a target coverage area, the switching indication information being included on one or more time slots of the reverse-channel switching frame located after the first time slot of the reverse-channel switching frame, the up or down command information of the switching indication information being transmitted by using a third power level of the mobile terminal that is higher than the second power level.

2. The method of claim 1, wherein the first power level is a preset full power level.

3. The method of claim 1, wherein a power level of the up or down command information of the switching indication information is identical to the first power level.

4. A method for transmitting a reverse-channel quality indicator channel by a mobile terminal, the method comprising:
   preparing the reverse-channel quality indicator channel; and
   transmitting the reverse-channel quality indicator channel from the mobile terminal to a corresponding base transceiver subsystem of a source coverage area,
   wherein the reverse-channel quality indicator channel comprises:

at least one first frame having first information on a carrier-to-interference ratio transmitted by using a first power level of the mobile terminal at a first time slot of the first frame, information consisting of an UP or down command information in a form of first type of differential information for the carrier-to-interference ratio, transmitted by using a second power level of the mobile terminal that is lower than the first power level, and switching indication information consisting of an up or down command information in a form of second type of differential information for the first information at one or more time slots of the first frame located after the first time slot of the first frame, the switching indication information being covered with a Walsh code corresponding to a target coverage area, the up or down command information of the switching indication information being transmitted on the reverse-channel quality indicator channel by using a third power level of the mobile terminal that is higher than the second power level; and at least one second frame having second information on the carrier-to-interference ratio transmitted on the reverse-channel quality indicator channel by using the first power level, and differential information for the second information on the carrier-to-interference ratio transmitted by using the second power level of the mobile terminal.

5. The method of claim 4, wherein a power level of the up or down command information of the switching indication information is identical to the first power level.

* * * * *